(12) United States Patent
Bajic et al.

(10) Patent No.: US 11,520,701 B2
(45) Date of Patent: Dec. 6, 2022

(54) DATA STRUCTURE OPTIMIZED DEDICATED MEMORY CACHES

(71) Applicant: Tenstorrent Inc., Toronto (CA)

(72) Inventors: Ljubisa Bajic, Toronto (CA); Davor Capalija, Toronto (CA); Ivan Matosevic, Toronto (CA); Alex Cejkov, Toronto (CA)

(73) Assignee: Tenstorrent Inc., Toronto (CA)

( * ) Notice: Subject to any disclaimer, the term of this patent is extended or adjusted under 35 U.S.C. 154(b) by 0 days.

(21) Appl. No.: 17/221,523

(22) Filed: Apr. 2, 2021

(65) Prior Publication Data

US 2022/0318144 A1   Oct. 6, 2022

(51) Int. Cl.
*G06F 12/0811* (2016.01)
*G06F 12/0813* (2016.01)
*G06N 3/063* (2006.01)
*G06F 13/16* (2006.01)
*G06F 11/34* (2006.01)
*G06F 12/06* (2006.01)

(52) U.S. Cl.
CPC ...... *G06F 12/0811* (2013.01); *G06F 11/3466* (2013.01); *G06F 12/0646* (2013.01); *G06F 12/0813* (2013.01); *G06F 13/1668* (2013.01); *G06N 3/063* (2013.01)

(58) Field of Classification Search
None
See application file for complete search history.

(56) References Cited

U.S. PATENT DOCUMENTS

| 10,757,214 B2 | 8/2020 | Wouhaybi et al. |
| 2009/0248986 A1* | 10/2009 | Citron ........... G06F 12/0897 |
| | | 711/E12.024 |
| 2010/0281216 A1 | 11/2010 | Patel et al. |
| 2012/0144117 A1 | 6/2012 | Weare et al. |

(Continued)

FOREIGN PATENT DOCUMENTS

| GN | 106161569 A | 11/2016 |
| WO | 2019155241 A1 | 8/2019 |

OTHER PUBLICATIONS

Alam et al., "A Survey: Software-Managed On-Chip Memories", Computing and Informatics, Aug. 2013, 31 pages.

(Continued)

*Primary Examiner* — Charles J Choi
(74) *Attorney, Agent, or Firm* — Daylight Law, P.C.

(57) ABSTRACT

Methods and systems associated with caches are disclosed. One disclosed system includes at least one memory storing at least two data structures. The at least two data structures include a first data structure and a second data structure. The system also includes at least two caches with a first cache which caches the first data structure and a second cache which caches the second data structure. The system also includes a controller communicatively coupled to the at least two caches. The controller separately configures the first cache based on the first data structure and the second cache based on the second data structure. The system also comprises at least one processor communicatively coupled to the at least two caches. The processor accesses each of the at least two data structures using the at least two caches and during the execution of a complex computation.

33 Claims, 4 Drawing Sheets

(56) References Cited

U.S. PATENT DOCUMENTS

| | | | | |
|---|---|---|---|---|
| 2012/0166723 A1* | 6/2012 | Araki | ............... | G06F 12/0246 |
| | | | | 711/E12.019 |
| 2019/0102302 A1* | 4/2019 | Taht | ................ | G06F 12/0862 |
| 2020/0097799 A1* | 3/2020 | Divakar | ............ | G06F 7/5443 |
| 2020/0401402 A1 | 12/2020 | Capalija et al. | | |
| 2021/0004684 A1 | 1/2021 | Matveev et al. | | |

OTHER PUBLICATIONS

Alam et al., "Current Trends and the Future of Software-Managed on-Chip Memories in moderns Processors", International Conference on High Performance Computing Systems, Jul. 2010, 9 pages.

Amazon Web Services, "Performance at Scale with Amazon ElastiCache", Jul. 2019, accessed online on Sep. 24, 2020 at https://d0.awsstatic.com/whitepapers/performance-at-scale-with-amazon-elasticache.pdf, 51 pages.

Cheriton et al., "Software-controlled caches in the VMP multiprocessor", ACM SIGARCH Computer Architecture News, Jun. 1986, 16 pages.

Gupta et al., "DeepRecSys: A System for Optimizing End-To-End At-scale Neural Recommendation Inference", arXiv:2001.02772, 14 pages.

Hallnor et al., "A Fully Associative Software-Managed Cache Design", 27th Annual International Symposium on Computer Architecture (ISCA), Jun. 2000, 10 pages.

Ke et al., "RecNMP: Accelerating Personalized Recommendation with Near-Memory Processing", arXiv:1912.12953, 14 pages.

Lu et al., "Soft-OLP: Improving Hardware Cache Performance Through Software-Controlled Object-Level Partitioning", accessed online on Sep. 24, 2020 at https://web.njit.edu/~dingxn/papers/Soft-OLP.pdf, 12 pages.

Maxim Naumov, "On the Dimensionality of Embeddings for Sparse Features and Data", arXiv:1901.02103v1 [cs.LG], Jan. 7, 2019, 8 pages.

Maxim Naumov, et al., "Deep Learning Recommendation Model for Personalization and Recommendation Systems", arXiv:1906.00091v1 [cs.IR], May 31, 2019, 10 pages.

Oleksii Hrinchuk, et al., "Tensorized Embedding Layers", arXiv:1901.10787v2 [cs.CL], Feb. 19, 2020, 13 pages.

Palpanas et al., "Cache Management Policies for Semantic Caching", accessed online on Sep. 24, 2020 at http://citeseerx.ist.psu.edu/viewdoc/download?doi=10.1.1.553.3008&rep=rep 1 &type=pdf, 18 pages.

Qureshi et al., "Adaptive Insertion Policies for High Performance Caching", ISCA'07, Jun. 9-13, 2007, 11 pages.

Ranjith Subramanian et al., "Adaptive Caches: Effective Shaping of Cache Behavior to Workloads", accessed online an Sep. 24, 2020 at https://yanniss.github.io/adapt-TR2006.pdf, 14 pages.

Smaragdakis, "General Adaptive Replacement Policies", ISMM'04, Oct. 24-25, 2004, 14 pages.

Speight et al., "Adaptive Mechanisms and Policies for Managing Cache Hierarchies in Chip Multiprocessors", IEEE, 2005, 11 pages.

Stefanovici et al, "Software-Defined Caching", Technical Report CSRG-626, accessed online on Sep. 24, 2020 at ftp://ftp.cs.toronto.edu/csrg-technical-reports/626/ut-csrg-626.pdf, 10 pages.

Extended European Search Report dated Sep. 10, 2022 from European Patent Application No. 22166217, 7 pages.

\* cited by examiner

DATA STRUCTURE OPTIMIZED DEDICATED MEMORY CACHES

BACKGROUND

Caches are components which store data. They can be implemented in hardware or software. A computing component such as a processing pipeline, operating system, web browser, or other client, can obtain stored data from a cache by sending the cache an access request to the cache and store data in the cache by sending a storage request to the cache. The cache can service these requests by returning the data that is the subject of the access request or by storing the data that is the subject of the storage request. The cache can store the data in a cache memory, which stores a small amount of data but can provide it quickly, or in a back store memory, which can store more data but provides the data more slowly.

Figure 1:
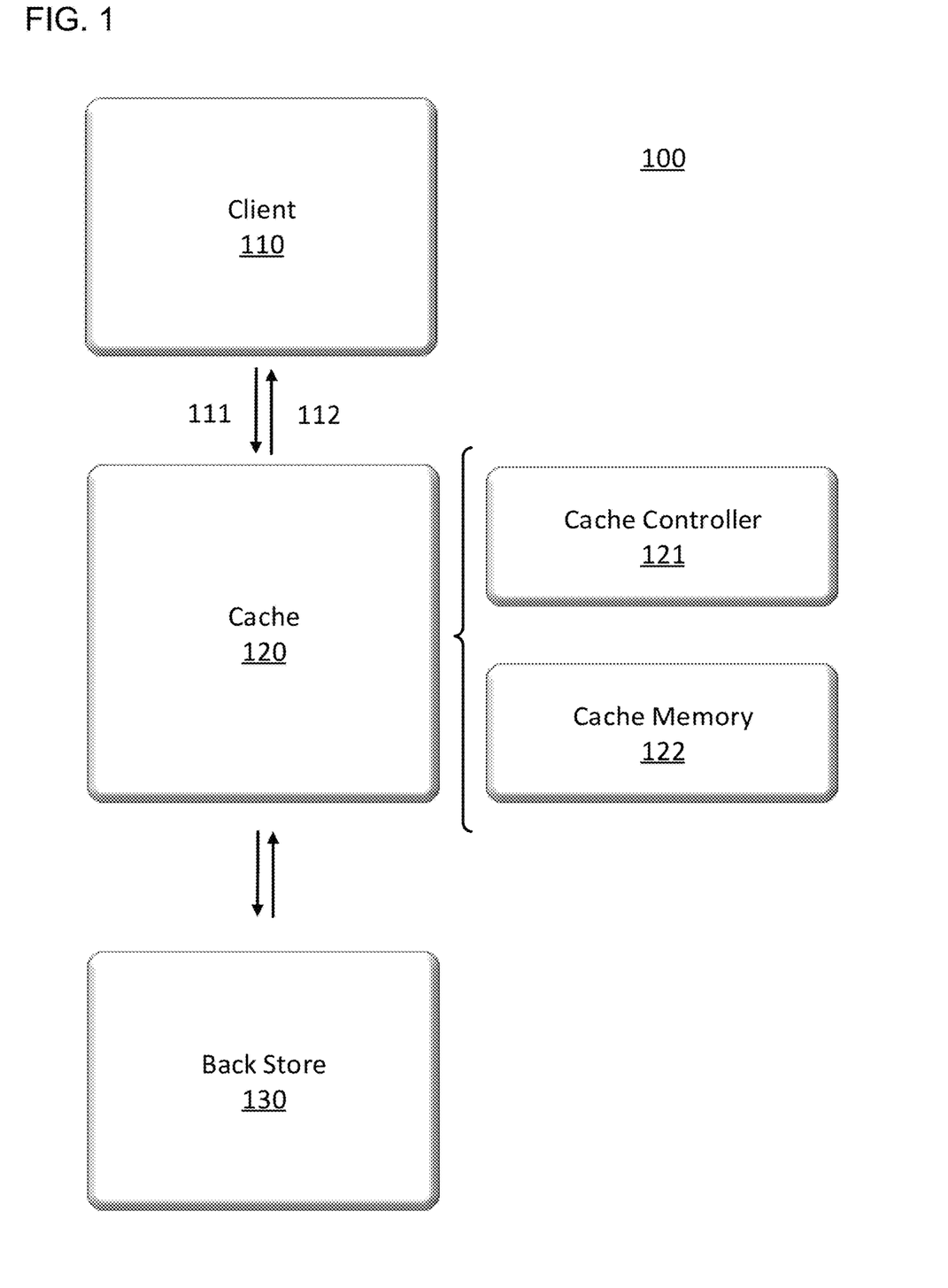
FIG. 1 illustrates a block diagram for the operation of a cache in processing a memory access request in accordance with the related art.

FIG. 1 is a block diagram 100 of the operation of a cache to illustrate some of the terms used in this disclosure. The block diagram shows the cache operating to process an access request and retrieve data, but similar principles apply to processing a storage request. Block diagram 100 includes client 110 which sends access requests 111 to cache 120 and holds for access request responses 112. If the cache is successful, the access request responses 112 will include the requested data. Upon receiving access request 111, cache 120 will retrieve the requested data either from cache memory 122, or, if the data is not present in cache memory 122, from back store 130. An example of cache memory 122 and back store 130 are a high-speed static random-access memory (SRAM) and a dynamic random-access memory (DRAM) respectively. Caches can also include back stores with different kinds of memory which are broken into different levels based on how fast the memory is, with the higher levels being occupied by higher speed memories. As used in this disclosure, data is "cached" by cache 120 if the data is stored to be accessible for return in an access request response 112 regardless of whether the data is stored in cache memory 122 or in back store 130.

Caches can process an access requests faster if it can anticipate what data will be requested and store it in a faster memory. When the cache successfully anticipated which data would be requested in an access request and had the data available and stored in cache memory 122, it can be referred to as a cache "hit." If the data is not available in cache memory 122, and the cache 120 had to access the data from back store 130, it can be referred to as a cache "miss." Cache controller 121 can be configured to maximize the ratio of cache hits to access requests and the overall speed at which access requests from client 110 are serviced with access request responses 112. The cache controller 121 can be configured to take advantage of expected spatial and temporal locality in the access requests to improve these metrics. The cache controller 121 can also be configured by changing the scheme for and way in which data is tagged to indicate its presence and location within cache memory 122, changing a policy for when data in the cache memory 122 is replaced with data in back store 130, changing a policy for when data stored into the cache is written directly to back store 130 or stored in cache memory 122, and numerous other approaches.

SUMMARY

Methods and systems related to the field of computer caches are disclosed. Specific disclosed embodiments are related to computational systems with at least two caches where each of the caches is dedicated for a specific data structure and are optimized for that data structure. The data structures can be used to store data for a single complex computation which requires data stored in the various caches of the at least two caches. The caches can be optimized for caching the data structure to which they have been assigned to minimize latency and maximize the throughput of access request responses. The optimization can include maximizing a hit ratio of the cache and a rate of access requests processed. The optimization can be achieved by changing the cache based on an evaluation of the data in the data structure or based on an evaluation of the performance of the cache in servicing access requests for the data structure.

Specific embodiments of the invention are related to the execution of a complex computation in the form of an accelerated execution of a directed graph by at least one processor or a network of computational nodes. In specific embodiments, the network of computational nodes includes a multicore processor where the computational nodes are processing cores in the multicore processor. In specific embodiments, the directed graph can implement an artificial neural network (ANN). In specific embodiments, the directed graph can implement a deep learning recommendation model (DLRM). In these embodiments, executing the complex computation can comprise generating an inference from a neural network. In these embodiments, the data structures can be tensors storing network data such as the inputs, weights, filters, accumulation values, embeddings, and other information needed to draw inferences from or train the ANN. In specific embodiments, one data structure could be a layer of a neural network or a portion thereof, or a filter of a convolutional portion of a neural network or a portion thereof.

In specific embodiments of the invention a system is disclosed. The system comprises at least one memory storing at least two data structures. The at least two data structures include a first data structure and a second data structure. The system also comprises at least two caches. The at least two caches include a first cache which caches the first data structure and a second cache which caches the second data structure. The system also comprises a controller communicatively coupled to the at least two caches. The controller separately configures the first cache based on the first data structure and the second cache based on the second data structure. The system also comprises at least one processor communicatively coupled to the at least two caches. The processor accesses each of the at least two data structures using the at least two caches and during the execution of a complex computation.

In specific embodiments of the invention a method is disclosed. The method comprises configuring, using a controller, a first cache based on a first data structure and caching, using a first cache, the first data structure. The method also comprises configuring, using the controller, a second cache based on a second data structure, and caching, using the second cache, the second data structure. The method also comprises executing, using at least one processor, a complex computation; and accessing, using the at least one processor and during the execution of the complex computation, data from the first data structure and data from the second data structure.

DETAILED DESCRIPTION

Methods and systems related to the field of computer caches in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

As stated in the summary, in specific embodiments of the invention, caches can be dedicated for specific data structures and optimized specifically for their dedicated data structure. This can be beneficial because the above-mentioned aspects of the data that can be used by the cache controller to configure the cache, such as expected spatial and temporal locality in the access requests, may vary to an appreciable degree based on the characteristics of the stored data and/or how that data is utilized. Specific embodiments of the invention disclosed herein can be beneficially applied to machine learning applications that operate on large data structures with highly variant degrees of sparsity because standard methods for optimizing a cache are often confounded in these applications in that a cache policy optimized for one data structure from among a set of data structures having these characteristics, will actually retard the performance of the cache for another data structure among the same set.

In specific embodiments of the invention, at least one processor will access at least two caches during the execution of a complex computation. The caches can be dedicated for specific data structures required for the execution of the complex computation. The at least two caches can be dedicated for the specific data structures in that the entire data structure is stored in the cache and any data that needs to be recalled from or stored in the data structure can be retrieved from or written to that specific cache. The examples herein generally illustrate a system with two caches. However, any number of caches can be utilized depending upon the number of data structures required for the execution of the complex computation.

The data structures and complex computation can take on various forms. The data structures can be variables in the source code of the complex computation. The data structures can be tensors used in the execution of a directed graph that is calculated by executing the complex computation. The data structures can include a layer of an artificial neural network (ANN), individual weights or filters of an ANN, accumulation values of a layer of an ANN, inputs of an ANN, and outputs of an ANN. Those of ordinary skill in the art will recognize that a tensor for the execution of a complex computation that implements an ANN can be subject to numerous access requests for composite computations of the complex computation. For example, if the tensor is a layer of the ANN, and the ANN is a convolutional neural network, the same tensor will be accessed numerous times for the execution of numerous composite computations as a filter slides around the tensor to execute the overall convolution. As such, the data structure is the subject of many access requests and optimizing cache performance for those access requests can provide an accordingly large degree of performance improvement to the execution of the complex computation.

The at least one processor can take on various forms. The at least one processor can include a network of computational nodes such as a network of processing cores. The at least one processor can include multiple processing cores in a multi-core processor. In specific embodiments, the at least one processor can be a network on chip (NoC). Although some of the specific examples provided herein are directed to a network of computational nodes in the form of a NoC connecting a set of processing cores, the approaches disclosed herein are broadly applicable to any form of network connecting any form of computational nodes that cooperate to execute a complex computation and that can mutually access a dedicated cache for a data structure to do so. Furthermore, networks in accordance with this disclosure can be implemented on a single chip system, including wafer-scale single chip systems, in a multichip single package system, or in a multichip multipackage system in which the chips are commonly attached to a common substrate such as a printed circuit board (PCB), interposer, or silicon mesh. Networks in accordance with this disclosure can also include chips on multiple substrates linked together by a higher-level common substrate such as in the case of multiple PCBs each with a set of chips where the multiple PCBs are fixed to a common backplane. Networks in accordance with this disclosure can also be implemented in chiplet based systems. For example, in specific embodiments of the invention, one or more computational nodes could be housed or implemented by one or more chiplets, connected, for example, through an interposer.

Figure 2:
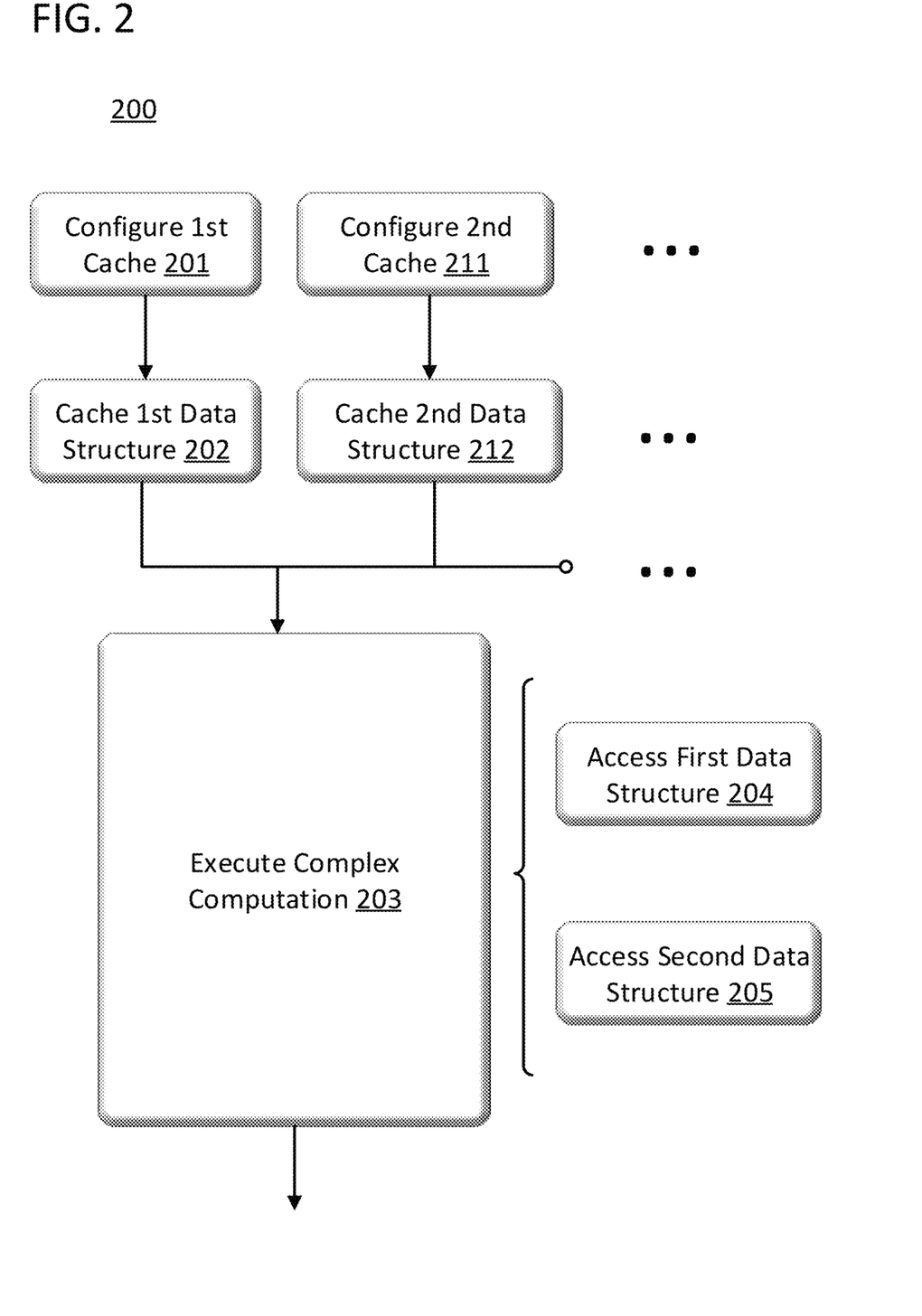
FIG. 2 illustrates a flow chart for a set of methods in accordance with specific embodiments of the invention disclosed herein.

FIG. 2 includes a flow chart 200 for a set of methods that are in accordance with specific embodiments of the present invention. The methods can be executed by various systems such as system 300 in FIG. 3. Flow chart 200 illustrates the flow of steps for a system that includes at least two caches, while the ellipses in flow chart 200 are placed to illustrate the fact that the method can be executed by any number of separate dedicated caches. For example, in specific embodiments of the invention, a complex computation involving hundreds of data structures can be executed using a system that implements hundreds of caches. Flow chart 200 includes steps 201 and 202 of configuring a first cache based on a first data structure and caching the first data structure. Flow chart 200 also includes steps 211 and 212 of configuring a second cache based on a second data structure and caching the second data structure. Step 202 can be conducted by the first cache. Step 212 can be conducted by the second cache. Although the steps are drawn such that configuration occurs prior to caching, in specific embodiments of the invention the cache may be configured based on the data after the data has been stored in the cache for a period such that configuring the cache specifically for a given data structure does not necessarily need to occur prior to caching that data structure.

Figure 3:
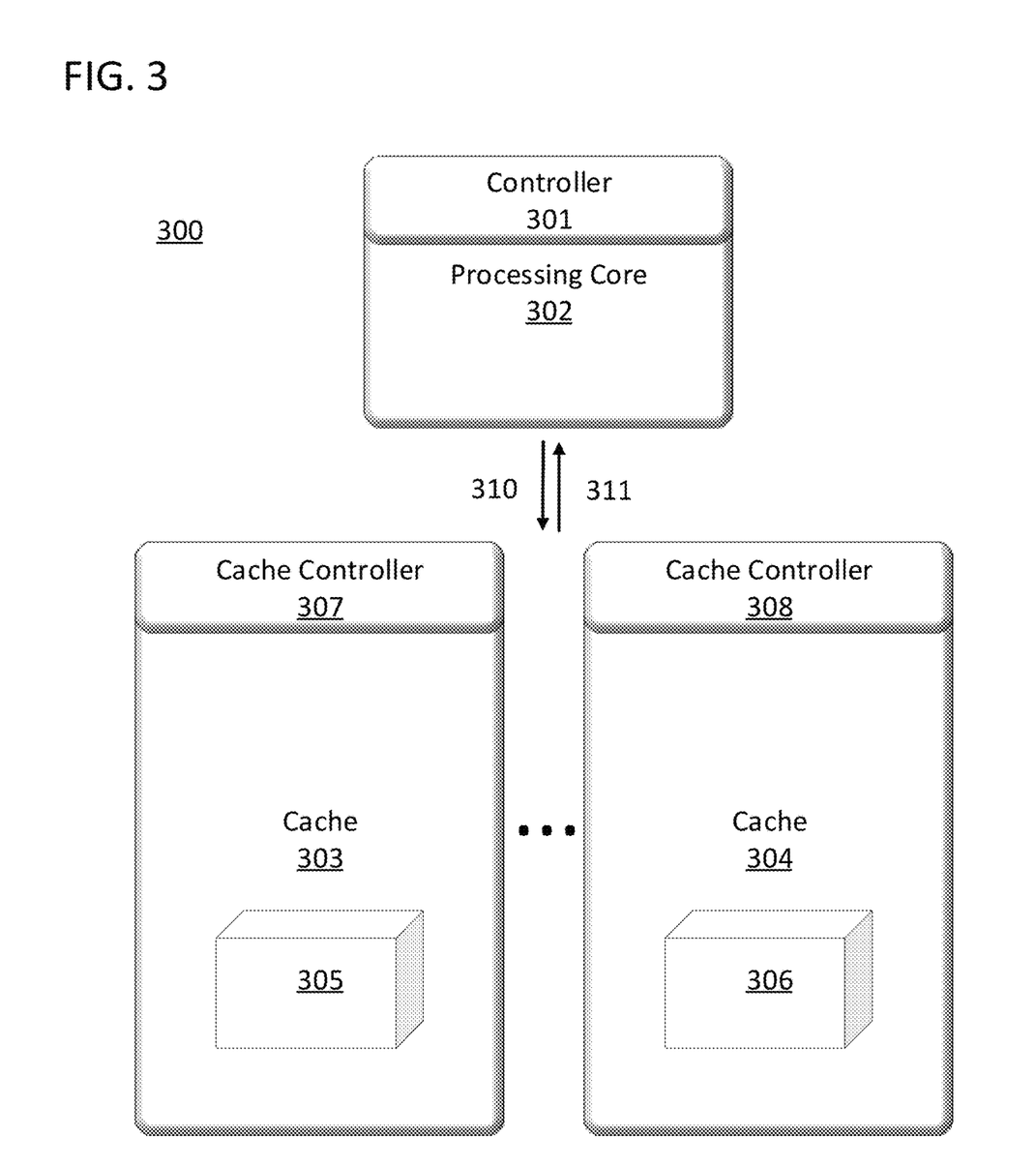
FIG. 3 illustrates a system for executing a complex computation in accordance with specific embodiments of the invention disclosed herein.

Steps 201 and 211 can be conducted by a controller. The controller can be implemented in hardware or software. The controller could be implemented by one or more kernels and executable source code on a processor. The processor could be a client of the cache. In alternative embodiments the controller can be implemented separately from the client. For example, in a multicore processor, the controller could be an external controller tasked with administrating the multicore processor (e.g., assisting with parallelization and programming of the various cores of the multicore processor) or the controller could be implemented by a core in the multicore processor. In system 300, the controller 301 is implemented by a processing core 302 which is also a client of cache 303 and 304.

Flow chart 200 continues with executing, using at least one processor, a complex computation. In the example of FIG. 3, the at least one processor is processing core 302. The complex computation can involve the execution of a directed graph which implements an ANN. Processing core 302 can execute the complex computation using a processing pipeline and a sequence of instructions. The sequence of instructions can include operands and operation codes for the processing pipeline. The operands can reference data which is stored in the data structures which are cached by the first cache and the second cache. Accordingly, step 203 can also involve accessing, using the at least one processor and during the execution of the complex computation, data from the first data structure, in step 204, and data from the second data structure, in step 205. The step can be conducted by the at least one processor in that the processor will be communicatively coupled with the caches to send them access requests. The communicative coupling can involve a bus connecting the at least one processor with the cache. The communicative coupling could also involve a network for a network of computing nodes to which the at least one processor was a part. For example, the communicative coupling could involve the network layer of a NoC. As illustrated in FIG. 3, these steps can include processing core 302 providing access requests 310 to a first cache 303 and a second cache 304 in order to access data from a first data structure 305 and a second data structure 306, and the caches providing data from those data structure back to processing core 302 in access request responses 311.

In specific embodiments of the invention, the caches are dedicated for specific data structures. For example, cache 303 is dedicated for data structure 305 and cache 304 is dedicated for data structure 306. The cache is dedicated for the data structure in that it caches the data structure and any read or write request for data in the data structure can be processed by the cache. This configuration is in contrast to traditional cache techniques where a cache is tasked with caching all the data needed for a complex computation and pulls data into the cache memory from multiple data structures based on when the overall complex computation may need to access data from the multiple structures.

The illustrated approach exhibits certain benefits in that data structure 305 and data structure 306 may be amenable to highly disparate cache configurations based on the characteristics of the data and how the data structure is used in the complex computation. For example, data structure 305 may be an input to a CNN layer in a DLRM. As a result, data structure 305 will be utilized in a manner which involves a high degree of spatial locality as adjacent elements of the data structure will be used together as the filter of the CNN layer is slid around the data structure. As such, the optimal cache configuration for cache 303 will be one which highly favors spatial locality and keeps spatially related values in the cache memory for longer periods. In the same DLRM, data structure 306 could be an embedding lookup table with hardly any degree of spatial relationship between sequential lookups. As a result, the optimal cache configuration for cache 303 should not be applied to cache 304 as it would lead to a high level of cache misses that a configuration based on logical relationships between access requests and responses in the sequences.

In the embodiments mentioned in the prior paragraph, the client, or clients, of the caches will be configured to maintain a concordance between data structures and caches so that the appropriate cache will receive an access request. In specific embodiments of the invention in which the caches are implemented in a multicore processor, each cache could be implemented by processing cores in a one-to-one correspondence and one or more separate processing core could maintain the above-mentioned concordance and route access requests to the appropriate processing cores based on that concordance. Alternatively, each processing core could maintain this concordance, or a portion thereof, and route the access requests to the disparate processing cores directly. In these embodiments, each processing core could also be configured to only maintain the portion of the concordance associated with the data structures it would need to access during the execution of a complex computation which may not include all the data structures in the system. For example, when instructions for composite computations for the complex computation were assigned to a given processing core, a portion of the concordance associate with the operands of those composite computations could be simultaneously loaded into the processing core.

In specific embodiments of the invention, the caches can be configured based on the data structures in various ways. The caches could be configured based on characteristics of the data structure, on the observed performance of the cache in caching the data structure, or a combination of these factors. The configuration of the cache can be set initially when the data structure is first dedicated to the cache, periodically according to a set schedule, when triggered by a change in the data content of the data structure, when triggered by a change in a performance metric of the cache in caching the data structure, or a combination of these methodologies. The configuration of the cache can be a dynamic aspect of the cache and can change through the course of the execution of a complex computation that utilizes data from the cache, or a fixed aspect of the cache that does not change through the course of the computation after it is initially set. In specific embodiments of the invention where the cache is configured based on the observed performance of the cache, the performance could be observed in an iterative fashion as the cache was configured. In other words, the cache could be configured and the performance of the cache in that configuration could be observed as part of a search for the optimal cache configuration for a given data structure and/or workload.

In specific embodiments of the invention, the cache can be occasionally reconfigured based on an observed change in performance of the cache, a change in the characteristics of the access requests (e.g., a change in workload), or a change in the data structure stored by the cache. In a specific example, the characteristics of the data structure could be monitored and if the sparsity of the stored data changed by X %, a different cache policy could be selected. As another example, a search process for an optimal cache configuration involving the selection of various configurations for the cache and the monitoring of the performance of the cache in response to those selected configurations could be triggered to run if the data structure or workload of the cache was determined to have changed beyond a given threshold.

In embodiments in which the cache is configured based on the characteristics of the data structure, the characteristics can be selected and evaluated in various ways. Configuring the cache based on the data structure can include analyzing the data of the data structure to produce a first analysis. The analysis can then be used to configure the cache. Both the analysis and the configuring can be conducted by a controller. Examples of configuring the cache based on characteristics of the data structure include an analysis of the actual data content of the data structure in terms of sparsity, density, volume, type of data stored (e.g., 8-bit integer, 16-bit integer, floating point, Boolean, etc.), and other factors. The analysis for this purpose can involve a scan of the data content of the data structure by pulling all the data from memory or receiving a digest of the data content of the data from a separate analysis engine. The analysis achieved through this scan could be updated when a computation was conducted that changed the content of the data structure. For example, an operation that zeroed all the entries in a portion of the data structure could lead to an update of a stored analysis of the content of the data structure when writing the data back to the cache. The cache can also be configured based on the characteristics of the data structure in terms of how the data structure is to be used in a complex computation. For example, if it were known that a characteristic of the data structure was that it was an input to a convolutional layer of an ANN, the cache policy could be set to favor spatial locality of access requests. These kinds of approaches are beneficially combined with those in which the cache is software configurable as will be described below.

In embodiments in which the cache is configured based on evaluating the performance of the cache in caching the data structure, the performance can be evaluated in various ways. The configuring of the cache based on the data structure can include analyzing a performance metric of the cache while the cache is caching the data structure to produce an analysis, and configuring the cache based on the analysis. Both the analysis of the performance metric and the configuring of the cache can be conducted by a controller. The analysis of the metric can also be conducted in combination with the client of the cache and/or by a local controller of the cache. The performance metrics evaluated can include overall throughput of access request services, the average or maximum latency of servicing specific access requests, the ratio of cache hits to cache misses, and various other factors. The metrics can likewise be measured in various ways. For example, the cache can first be configured with a default configuration on a first run of a complex computation and the performance can be evaluate through the course of the entire run. The cache can then be reconfigured at the end of each run to optimize metrics for the next iteration. As another example, the cache metrics can be evaluated during the execution of a single complex computation and the configuration can be altered on-line as the computation is running. The performance can be measured by the at least one processor as it monitors how long it waits for an access request to be serviced using a local clock, by the cache itself as it counts cache hits and cache misses, or a combination of these approaches.

In specific embodiments of the invention, the various caches of the system can be separately configured by a controller. For example, a controller, such as controller 301, can separately configure cache 303 and 304 by configuring cache controller 307 and cache controller 308. In specific embodiments, the controller can be a software controller and the cache controllers can be hardware controllers. The software controller can be programmed using code at the same level as that used to specify the complex computation. For example, any analysis of the cache performance or data structure and any configuration enacted in response thereto can be defined logically in source code. As a basic example, a function "sparsity(A)" could provide the sparsity of a data structure in the form of a tensor "A" and the function could be used to define a trigger for configuring the cache according to a specific policy "policy_1" (e.g., "if sparsity(A)>90% then configure.cache_A.policy_1"). The configuration instructions could be encoded in the same code used to define the complex computation. Accordingly, the times at which the analyses were conducted could likewise be controlled relative to the execution of composite computations as they could be interspersed amongst the lines of code defining the complex computation. The cache controllers can be linked to the controller by an API to facilitate this type of functionality. The API can send requests for various metrics, receive information in response to those requests, send commands to configure the caches, and receive pushed indications regarding the performance of the cache or the characteristics of the data structure. In situations in which the cache controllers were hardware controllers, the API could involve writing to configuration registers and reading from status registers on the hardware caches. In the case of pushed data, the hardware controllers could be connected to the controller via a dedicated interrupt line or otherwise have the ability to send interrupts through a communicative connection with the controller.

In specific embodiments of the invention, the caches can be configured in various ways. The caches can be individually configured so that they are independently optimized for the data structures they are caching. For example, configuring a cache can include defining or setting a policy of a cache, configuring a size of a cache memory, altering the cache coherency rules of the cache, altering an associativity of the cache, selecting different physical memories or different types of memories to serve as the cache memory and the various levels of the back store, and other methods for configuring a cache. Altering an associativity of the cache can include switching the cache between a direct mapped, set associative, or fully associative associativity scheme. Setting a policy for a cache can include setting a replacement policy for a cache, changing a write back policy for a cache, changing a write-through policy of a cache, changing an eviction policy for the cache, and various other potential policies. For example, a replacement policy could be changed from a least recently used (LRU) policy to a time aware least recently used (TLRU) policy, least frequently used (LFU), or a least frequently recently used (LFRU) policy. The changes can all be conducted with the objective of optimizing cache performance for a dedicated data structure in mind based on that data structure.

Using the approaches described above, numerous combinations of methods for evaluating the data structure or the cache performance in caching the data structure and configuring the cache in response thereto can be applied. In a particular example, the evaluation of the data could determine that the data structure was being accessed in a way that favored retaining portions of the data structure that were physically close to recently accessed portions, and the replacement policy could be augmented to favor retaining such portions. In another example, the evaluation of cache performance could include selecting the associativity scheme of the cache to direct mapped, monitoring the performance of the cache for two minutes, changing the associativity scheme of the ache to fully associative, monitoring the performance of the cache for an additional two minutes, and then selecting the associativity scheme that produced the highest access request service bandwidth. In specific embodiments in which a given cache will hold a data structure for a DLRM that is used to generate inferences using the same network values for several hours, or even days, the time taken to observe and monitor the cache performance in different configurations can be negligible. More advanced search algorithms can be applied to find the best configuration for a given data structure or workload including multivariate search algorithms that alter more than one aspect of the cache configuration including the various policies, size, memory hierarchy, and associativity schemes of the cache.

In specific embodiments of the invention, the at least one processor which accesses the dedicated caches can be a computational node in a network of computational nodes. For example, the at least one processor could be a core in a multicore processor. The computational nodes can include any form of computation engine including arithmetic logic units, floating point units, and various forms of fundamental computation units and processing pipeline elements. The computational nodes can also include hardware and associated firmware or software for communicating with a network of the multicore processor.

In specific embodiments in which the computational nodes are processing cores in a multicore processor, the cores can include various elements. The cores could include a computation pipeline, a memory, a bus, and a network interface unit. Each core could also include a local controller. The memory could be a cache memory of the processing core such as a random-access volatile memory such as an SRAM. The cores could also include additional or more specific elements such as a higher-level controller, serializer/de-serializer, nonvolatile memory for modifiable configuration information, and any number of arithmetic logic units and other fundamental computation units. The local controller could be a core controller to coordinate or execute operations within the core. In specific embodiments, the core controller can be a dedicated Central Processing Unit (CPU). In either case, the core controller or CPU can administrate the transfer of data to a main processing pipeline of the processing core. If the computational nodes are processing cores, the processing pipeline of a node can be the main computation pipeline of a processing core and the associated memory can be the main memory of the processing core such as a cache of the processing core. The processing pipelines can be used to execute component computations required for the computation network to execute a composite computation.

Figure 4:
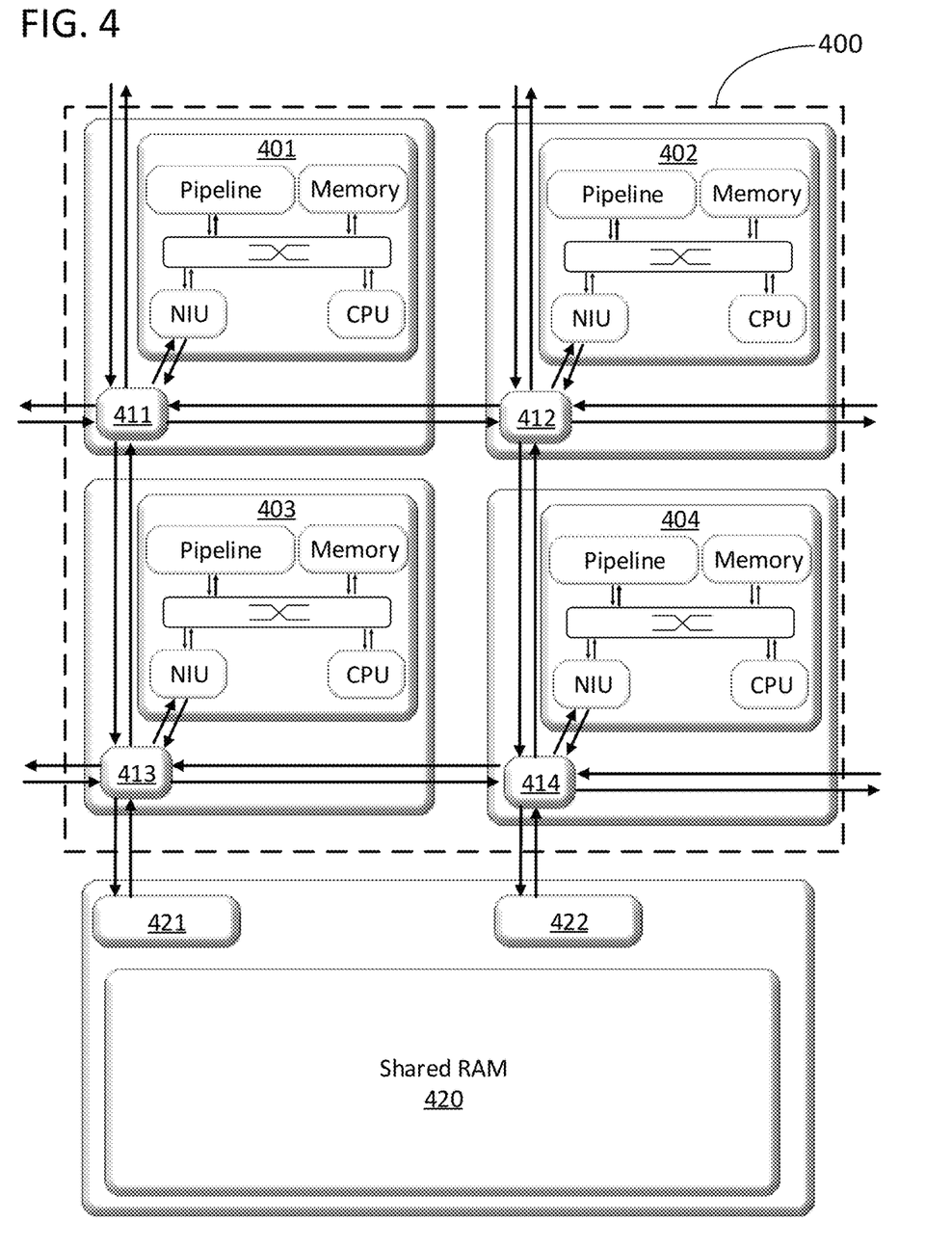
FIG. 4 illustrates a network of computational nodes for executing a complex computation in accordance with specific embodiments of the invention disclosed herein.

In specific embodiments, the network of computational nodes can be a NoC. FIG. 4 illustrates a portion of a NoC 400 in which four processing cores 401, 402, 403 and 404 are linked by a network. The network includes a set of buses and a set of routers that facilitate communication among the processing cores. There is a dedicated router associated with each processing core, such as routers 410, 411, 412 and 413. The routers 410, 411, 412 and 413 communicate with their associated processing core 401, 402, 403 and 404 using a network interface unit (NIU). The set of buses include wires connecting the routers to each other and the routers to their NIUs. The NIU is instantiated in hardware on the processing core. The processing cores execute the component computations they have been assigned using a memory and a processing pipeline. The inputs and outputs of the component computations are routed using the routers under the control of the NIUs. A CPU in the processing cores is involved in both the computation operations and the data flow management.

In specific embodiments of the invention, the process associated with FIG. 2 can involve storing, using at least one memory, a first data structure and a second data structure where the data structures are the data structures for which specific cores are dedicated in accordance with the embodiments disclosed above. This step can be conducted as a part of the step of caching the data structures as described above. In the case of FIG. 4, the at least one memory can include the memories on the cores 401, 402, 403, and 404 as well as a shared memory 420 which is connected to the NoC via channels 421 and 422. The shared memory 420 can be a DRAM and the memories on cores 401, 402, 403, and 404 can be SRAM or a combination of SRAM and slower memory. The shared memory 420 can serve as part of the back store for one or more caches implemented by the cores in NoC 400.

In specific embodiments of the invention, the computational nodes in a network of computational nodes can serve different roles in the caching scheme and the operation of the overall system to which they are a part. For example, the computational nodes can be clients of the cache, route access requests to various dedicated caches, and/or implement one or more dedicated caches. In specific embodiments, different computational nodes may serve different roles through the course of execution of a complex computation. In alternative embodiments, the different computational nodes will maintain a given role through the execution of a complex computation but can then be repurposed when it is time for the network to be reconfigured for the execution of a new complex computation.

In specific embodiments of the invention, the roles that the various computational nodes can be assigned will depend on their capabilities. For example, if a computational node has a large enough local memory, the computational node can implement a cache using its local memory as the cache memory of the cache. In the example of FIG. 4, the cache memory can be any of the memories of cores 401, 402, 403, and 404 that are located on a core which has been designated to implement a cache. As mentioned above, if a core serves to route access requests, it can be tasked with storing a concurrence between caches and data structures, as well as where those cashes are implemented in order to route the access requests appropriately. If a computational node has a sophisticated controller, it can also serve as the controller 301 which configures the various cache controllers of the network. For example, any of the CPUs on cores 401, 402, 403, and 404 could serve as controller 301. Alternatively, a separate higher-level controller shared by all of cores 401, 402, 403, and 404 could serve as controller 301. As another example, the cache controllers could be software controllers, and the CPUs on any of cores 401, 402, 403, and 404 which were dedicated for implementing a cache, could serve as the cache controllers of those caches (e.g., of core 401 was designated to implement a cache, the CPU on core 401 could serve as cache controller 307).

In specific embodiments of the invention, access request responses in the disclosed systems can be responses to requests to a memory of the computational system. The memory can be a hierarchical memory. The memory hierarchy can include a cache memory (such as a local SRAM memory), a separate random-access memory (such as an external DRAM memory), a separate nonvolatile memory (such as a flash memory), and additional hierarchical levels. In specific embodiments of the invention, such as those in accordance with the systems of FIG. 4, the various levels of the hierarchy can be provided by different processors in the network. For example, core 402 can provide a service to the remainder of the network and serve as a storage location for large data structures that are required by the remainder of the network. As such, the core 402 can serve as a second layer of a memory hierarchy for an alternative node in the network, where that alternative node's local cache memory is the first layer of the memory hierarchy. In this same example, the shared memory 420 could serve as a third layer of the memory hierarchy. Note that in this example, the levels of the hierarchy follow the classic characteristic of memory hierarchies in that accessing the cache memory of another computational node is slower than accessing a local SRAM, but faster than accessing a standard DRAM through the network.

In specific embodiments of the invention in which the computational system includes multiple computational nodes, access requests can be processed cooperatively by those various computational nodes. The nodes can be specialized nodes designed to handle specific aspects of the access requests, and other aspects of the execution of a directed graph. The nodes can also be generalized nodes that can be configured to handle specific aspects of the access requests, and other aspects of the execution of the directed graph, such as via the provisioning of instructions to the computational nodes. For example, one node may be designed or configured to conduct calculations for the execution of the directed graph, one node may be designed or configured to process the access requests and provide the access requests response to the appropriate computational node, and one node may be designed or configured to store the data identified by the access request and provide that data in response to receiving an access request message from separate node. In keeping with this example, in FIG. 4, node 401 could be a generic processing core that has been augmented, through the delivery of instructions to the memory of the processing core, to process access requests. In these embodiments, node 401 could be referred to as a look up orchestrator core. The general action of the look-up orchestrator core would involve receiving an access request and then servicing the request from local memory or delivering the requests to an alternative computational node or shared memory. Node 401 could store the concordance mentioned above regarding the data structures utilized by the complex computation and the caches dedicated thereto, as well as the location of those caches in the network. In keeping with this example, in FIG. 4 core 402 could be a generic processing core that has been augmented, through the delivery of instructions to the memory of the processing core, to receive access requests and return access request responses in response thereto. Such a core could be referred to as a cache core. In embodiments in which access request are delivered to an alternative computational node from a look up orchestrator core, the computational node could be a cache core which implements a cache controller for a cache, stores data, and is configured to provide a cache service for those requests by minimizing the expected access time of requests sent to the core. Accordingly, node 401 and 402 could cooperatively process an access request with node 401 sending the request to node 402 and waiting for a response. In this example, shared RAM 420 could serve as a backing store for the cache implemented by node 402. In alternative embodiments, a core could implement a backing store for the cache, as described above. For example, node 403 could implement a backing store for the cache implemented by node 402.

A system for executing any of the methods disclosed here can also include at least one processor and non-transitory computer readable media. The at least one processor could comprise at least one computational node in a network of computational nodes. The media could include cache memories on the processing cores such as first processing core 401 and second processing core 403 in FIG. 4. The media can also include shared memories that are not associated with a unique computational node. In network of computational nodes such as 400, the shared memory 420 could be a shared random-access memory and could be, for example, a DDR4 DRAM. The shared memory can be accessed by multiple channels such as channel 421 and 422. The non-transitory computer readable media can store data required for the execution of a directed graph by the system, instructions on how the directed graph should be executed, and instructions on how the data and instructions should be distributed amongst the computational nodes. The computer readable media can also store instruction which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although the examples in the disclosure refer mainly to computational nodes that are cores in a multicore processor, computational nodes can be general processing cores, graphics processors, neural network accelerators or any other computational node used in the parallel execution of complex computations. Although the example of the accelerated execution of a directed graph for a DLRM was provided herein, the disclosed approaches can be beneficially applied to any directed graph whose execution depends on access to large data structures having variant characteristics. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A system comprising:
    at least one memory storing at least two data structures, wherein the at least two data structures include a first data structure and a second data structure;
    at least two caches, wherein the at least two caches include a first cache which caches the first data structure and a second cache which caches the second data structure;
    a controller communicatively coupled to the at least two caches, wherein, during the operation of the system, the controller analyzes data of the first data structure to produce a first analysis and data of the second data structure to produce a second analysis, and separately configures, subsequent to analyzing the data of the first data structure and data of the second data structure: (i) the first cache based on the first analysis; and (ii) the second cache based on the second analysis; and at least one processor communicatively coupled to the at least two caches, wherein the at least one processor accesses each of the at least two data structures: (i) using the at least two caches; and (ii) during the execution of a complex computation.

2. The system of claim 1, wherein:
the first cache is dedicated for the first data structure;
the second cache is dedicated for the second data structure; and
the at least two caches are all individually dedicated for individual data structures from the at least two data structures.

3. The system of claim 1, wherein:
the at least two caches cache the at least two data structures in a one-to-one correspondence; and
the controller separately configures each cache, from the at least two caches, based on characteristics of each data structure, from the at least two data structures, stored therein.

4. The system of claim 1, wherein:
the controller separately configures the at least two caches by configuring at least two cache controllers of the at least two caches.

5. The system of claim 4, wherein:
the controller is a software controller; and
the at least two cache controllers are hardware controllers.

6. The system of claim 4, wherein:
the controller separately configures the first cache by setting a policy of a first cache controller of the first cache; and
the controller separately configures the second cache by setting a policy of a second cache controller of the second cache.

7. The system of claim 1, wherein:
the controller configures the first cache by setting a policy of the first cache based on the first analysis; and
the controller configures the second cache by setting a policy of the second cache based on the second analysis.

8. The system of claim 1, wherein:
the controller analyzes the data of the first data structure by analyzing a performance metric of the first cache while the first cache is caching the first data structure to produce the first analysis;
the controller configures the first cache by setting a policy of the first cache based on the first analysis;
the controller analyzes the data of the second data structure by analyzing a performance metric of the second cache while the second cache is caching the second data structure to produce the second analysis; and
the controller configures the second cache by setting a policy of the second cache based on the second analysis.

9. The system of claim 1, wherein:
the controller configures the first cache by setting a policy of the first cache;
the controller configures the second cache by setting a policy of the second cache; and
the policy of the first cache and the policy of the second cache are policies selected, individually, from the group consisting of: a replacement policy; a write through policy; and a write back policy.

10. The system of claim 1, wherein:
the at least one processor is a multicore processor;
the multicore processor includes a network of processor cores; and
a first processor core in the network of processor cores: (i) implements a cache controller of the first cache; (ii) receives access requests for the first data structure from the network; and (iii) services the access requests using the first cache and the network.

11. The system of claim 10, further comprising:
a shared memory of the network of processor cores; and
wherein the first processor core uses the shared memory as a backing store for the first cache.

12. The system of claim 10, further comprising:
a second processor core in the network of processor cores;
wherein the second processor core implements a backing store for the first cache.

13. The system of claim 10, further comprising:
a second processor core in the network of processor cores;
a third processor core in the network of processor cores;
wherein the second processor core implements a second cache controller of the second cache;
wherein the third processor core implements the controller; and
wherein the controller is communicatively coupled to the at least two caches using the network.

14. The system of claim 1, wherein:
the first data structure stores a layer of a neural network;
the second data structure stores a set of accumulation values for an execution of the neural network; and
executing the complex computation comprises generating an inference from the neural network using the layer and the set of accumulation values.

15. The system of claim 1, wherein:
the controller separately configures the at least two caches by selecting one of the at least two caches to serve as the first cache and another of the at least two caches to serve as the second cache.

16. A method comprising:
analyzing, using a controller and during the operation of the controller, data of a first data structure to produce a first analysis;
configuring, using the controller, and during the operation of the controller and subsequent to analyzing the data of the first data structure, a first cache based on the first analysis;
caching, using the first cache, the first data structure;
analyzing, using the controller and during the operation of the controller, data of a second data structure to produce a second analysis;
configuring, using the controller, and during the operation of the controller and subsequent to analyzing the data of the second data structure, a second cache based on the second analysis;
caching, using the second cache, the second data structure;
executing, using at least one processor, a complex computation; and
accessing, using the at least one processor and during the execution of the complex computation, the data from the first data structure and the data from the second data structure.

17. The method of claim 16, further comprising:
storing, using at least one memory, the first data structure and the second data structure; and wherein the at least one memory serves as a first backing store for the first cache and a second back store for the second cache.

18. The method of claim 16, wherein:
the first cache is dedicated for the first data structure; and
the second cache is dedicated for the second data structure.

19. The method of claim 16, wherein:
the configuring of the first cache using the controller is conducted based on characteristics of the first data structure; and
the configuring of the second cache using the controller is conducted based on characteristics of the second data structure.

20. The method of claim 16, wherein:
the controller separately configures at least two caches by configuring at least two cache controllers of the at least two caches.

21. The method of claim 20, wherein:
the controller is a software controller; and
the at least two cache controllers are hardware controllers.

22. The method of claim 20, wherein:
the configuring of the first cache using the controller comprises setting a policy of a first cache controller of the first cache; and
the configuring of the second cache using the controller comprises setting a policy of a second cache controller of the second cache.

23. The method of claim 16, wherein:
the configuring of the first cache using the controller comprises setting a policy of the first cache based on the first analysis; and
the configuring of the second cache using the controller comprises setting a policy of the second cache based on the second analysis.

24. The method of claim 16, wherein:
the analyzing the data of the first data structure comprises analyzing a performance metric of the first cache while the first cache is caching the first data structure to produce the first analysis;
the configuring of the first cache using the controller comprises setting a policy of the first cache based on the first analysis;
the analyzing the data of the second data structure comprises analyzing a performance metric of the second cache while the second cache is caching the second data structure to produce the second analysis; and
the configuring of the second cache using the controller comprises setting a policy of the second cache based on the second analysis.

25. The method of claim 16, wherein:
the configuring of the first cache using the controller comprises setting a policy of the first cache;
the configuring of the second cache using the controller comprises setting a policy of the second cache; and
the policy of the first cache and the policy of the second cache are policies selected, individually, from the group consisting of: a replacement policy; a write through policy; and a write back policy.

26. The method of claim 16, wherein:
the at least one processor is a multicore processor;
the multicore processor includes a network of processor cores; and
a first processor core in the network of processor cores: (i) implements a cache controller of the first cache; (ii) receives access requests for the first data structure from the network; and (iii) services the access requests using the first cache and the network.

27. The method of claim 26, wherein:
the first processor core uses a shared memory of the network of processor cores as a backing store for the first cache.

28. The method of claim 26, wherein:
the multicore processor includes a second processor core in the network of processor cores; and
the second processor core implements a backing store for the first cache.

29. The method of claim 26, wherein:
the multicore processor includes a second processor core in the network of processor cores;
the multicore processor includes a third processor core in the network of processor cores;
the second processor core implements a second cache controller of the second cache;
the third processor core implements the controller; and
the controller is communicatively coupled to the first cache and the second cache using the network.

30. The method of claim 16, wherein:
the first data structure stores a layer of a neural network;
the second data structure stores a set of accumulation values for an execution of the neural network; and
executing the complex computation comprises generating an inference from the neural network using the layer and the set of accumulation values.

31. The method of claim 16, wherein:
the configuring of the first cache and the second cache using the controller is conducted by selecting one of at least two caches to serve as the first cache and another of the at least two caches to serve as the second cache.

32. A system comprising:
a network of computational nodes, the network of computational nodes including at least one processor; and
non-transitory computer readable media, in the network of computational nodes, storing instructions which, when executed by the network of computational nodes, cause:
(i) a controller to analyze, during the operation of the system, data of a first data structure to produce a first analysis;
(ii) the controller to configure, during the operation of the system and subsequent to analyzing the data of the first data structure, a first cache based on the first analysis;
(iii) the first cache to cache the first data structure;
(iv) the controller to analyze, during the operation of the system, data of a second data structure to produce a second analysis;
(v) the controller to configure, during the operation of the system and subsequent to analyzing the data of the second data structure, a second cache based on the second analysis;
(vi) the second cache to cache the second data structure;
(vii) the at least one processor to execute a complex computation; and
(viii) the at least one processor to access, during the execution of the complex computation, the data from the first data structure and the data from the second data structure.

33. The system of claim 32, wherein:
the controller to configure the first cache and the second cache configures by selecting one of at least two caches to serve as the first cache and another of the at least two caches to serve as the second cache.

\* \* \* \* \*